(12) United States Patent
Amerena

(10) Patent No.: US 7,870,835 B2
(45) Date of Patent: Jan. 18, 2011

(54) ANIMAL WASTE DISPOSAL SYSTEM

(76) Inventor: William A. Amerena, 91 East St., Middleton, MA (US) 01949

(*) Notice: Subject to any disclaimer, the term of this patent is extended or adjusted under 35 U.S.C. 154(b) by 49 days.

(21) Appl. No.: 12/189,938

(22) Filed: Aug. 12, 2008

(65) Prior Publication Data

US 2009/0001738 A1    Jan. 1, 2009

(51) Int. Cl.
    *A01K 29/00*   (2006.01)
(52) U.S. Cl. ....................................... 119/161
(58) Field of Classification Search ........... 294/1.3–1.5, 294/19.1, 55, 99.1; 119/161; 248/95, 101, 248/99
    See application file for complete search history.

(56) References Cited

U.S. PATENT DOCUMENTS

| | | | | |
|---|---|---|---|---|
| 2,305,950 | A * | 12/1942 | Birch .......................... | 294/55 |
| 3,796,453 | A * | 3/1974 | Grimes ...................... | 294/1.3 |
| 4,014,584 | A | 3/1977 | Bau | |
| 4,368,907 | A | 1/1983 | Ross | |
| 4,686,734 | A * | 8/1987 | Alexander ................. | 15/257.1 |
| 4,765,666 | A | 8/1988 | Parks | |
| 4,958,871 | A * | 9/1990 | Hemans ...................... | 294/1.4 |
| 5,269,575 | A * | 12/1993 | Parvaresh ................... | 294/1.5 |
| 5,335,952 | A | 8/1994 | Clapper | |
| 5,344,201 | A * | 9/1994 | Offin .......................... | 294/24 |
| 5,350,208 | A | 9/1994 | Heinrichson | |
| 5,562,318 | A | 10/1996 | McBroom | |
| 5,667,264 | A | 9/1997 | Tanahara | |
| 5,868,447 | A * | 2/1999 | Clark et al. .................. | 294/1.4 |
| 5,921,596 | A * | 7/1999 | Sheriff et al. ................ | 294/1.4 |
| 6,012,748 | A * | 1/2000 | Franks ........................ | 294/1.4 |
| 6,234,549 | B1 | 5/2001 | Brownell | |
| 6,237,972 | B1 | 5/2001 | Jung | |
| 6,412,841 | B1 * | 7/2002 | Loraas et al. ................ | 294/51 |
| 6,478,351 | B1 * | 11/2002 | Nelson ....................... | 294/1.4 |
| 6,641,188 | B2 | 11/2003 | Arceo | |
| 6,702,349 | B2 | 3/2004 | Clements | |
| 6,892,419 | B1 | 5/2005 | Duprey | |
| 6,983,966 | B2 | 1/2006 | Azrikam | |
| 7,032,940 | B1 | 4/2006 | Smith | |
| 7,093,869 | B2 | 8/2006 | Jung | |
| 7,140,654 | B1 | 11/2006 | Ghent | |
| 7,188,878 | B1 * | 3/2007 | Kraus ......................... | 294/1.4 |
| 7,287,790 | B1 | 10/2007 | Kitiashvili | |
| 7,380,848 | B2 | 6/2008 | Petruzelli | |

* cited by examiner

*Primary Examiner*—Thomas Price
(74) *Attorney, Agent, or Firm*—Antoinette G Giugliano PC

(57) ABSTRACT

The present invention relates to animal waste scooper device and system. The scooper includes a base having a blade having a front edge, a back edge, a first side, a second side, a plurality of openings. The base also includes an elongated member having a top portion and a bottom portion, wherein the base is attached to or at the bottom portion of the elongated member; and the bottom portion is angled such that the blade axis has an angle in a range of between about 100 degrees and 140 degrees in relation to the top portion; and a hook mounted to the elongated member above the angle. The system further includes a pail having a handle; and a litter box having a bottom surface and four sides extending from the bottom surface, the four sides having a height between about 8 inches and about 12 inches.

17 Claims, 6 Drawing Sheets

ANIMAL WASTE DISPOSAL SYSTEM

BACKGROUND OF THE INVENTION

Elderly persons or persons who have knee or hip problems often have a difficult time cleaning out an animal litter box because it involves bending of the knees and/or hips. The process puts stress on the knees or hips, and in cases can be painful if the person has had surgery or has arthritis.

A need exists for a device or system that allows one to clean out their animal's litter box without having to bend. In particular, a need exists to remove the animal excrement from the litter box and dispose of it without having to bend. A further need exists to do so easily and efficiently.

SUMMARY OF THE INVENTION

The present invention relates to an animal waste scooper system that includes a scooper having a base that comprises a blade having a front edge, a back edge, a first side, a second side, and a plurality of openings; an elongated member having a top portion and a bottom portion, wherein the base is attached to or at the bottom portion of the elongated member; and the bottom portion is angled such that the blade axis has an angle in a range of between about 100 degrees and 140 degrees in relation to the top portion; and a hook mounted to the elongated member above the angle. The present invention includes the scooper, by itself, or as part of the system. The system further includes a pail having a handle; and a litter box having a bottom surface and four sides extending from the bottom surface, the four sides having a height between about 8 inches and about 12 inches. In an embodiment, the bottom portion of the elongated member is angled at about 120 degrees in relation to the top portion of the elongated member. In an aspect, the length of the top portion has a length ranging from about 36 inches to about 60 inches (e.g., about 48 inches). The length, in one aspect, between the front edge and the angle ranges between about 6 and about 12 inches (e.g., about 9 inches). The base has a length and/or width ranging, for example, from about 2 inches to about 10 inches (e.g., about 5 inches).

The present invention pertains to a method of scooping animal waste using the system, described herein. The method includes the steps of scooping the animal waste in the litter box with the scooper; engaging the handle of the pail with the hook of the scooper; and lifting the pail; wherein the user's knees do not need to substantially bend. The method can further embody disposing of the animal waste.

The present invention further includes kits encompassing the scooper, as described herein. The kits of the present invention, in another embodiment, include parts to retrofit an existing animal waste scooper having base and a short handle. The retrofit kit includes an elongated member having a top portion and a bottom portion, as described herein, wherein the handle of the base can be removably attached to the bottom portion of the elongated member. The elongated member includes a bottom portion that is angled in a range of between about 100 degrees and 140 degrees in relation to the top portion; a hook mounted to the elongated member above the angle; and at least one fastener (e.g., a reclosable fastener).

The present invention advantageously allows one who has trouble bending to clean the litter box. The user cannot only scoop the excrement from the litter box without having to kneel or bend, but also to dispose of the excrement with the use of the hook and pail configuration. The present invention further allows one who is trying to avoid contact with cat litter (e.g., a pregnant woman, asthmatics, or one that has allergies to cat litter) to use the present invention to clean out the litter box while keeping some distance away from it.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention relates to an animal waste (e.g., cat litter) scooping system. The system is ideal for persons who have trouble bending, e.g., elderly persons, individuals with arthritis, individuals who have had knee and/or hip surgeries. The system is also great for individuals with asthma, allergies or those who want to avoid contact with litter. In particular, the animal waste scooping system includes a scooper having an elongated handle disposed at an angle to the blade and a hook for receiving the handle of a pail, a pail with a handle, and a deep litter box.

Figure 1:
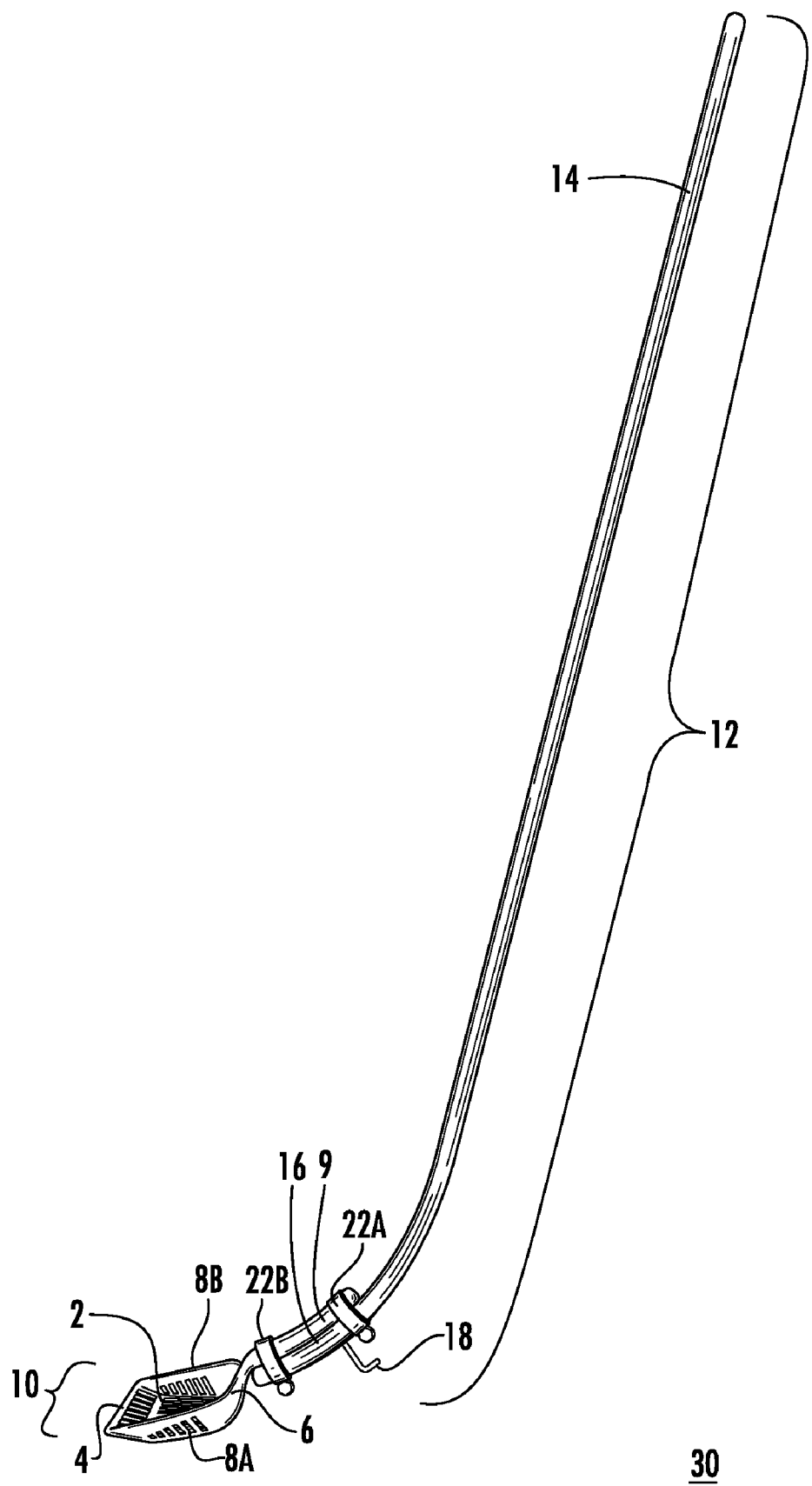
FIG. 1 is a schematic of a perspective view of the animal waste scooper of the present invention.

Referring to FIG. 1, scooper 30 includes base 10, which used to scoop the animal waste. The blade 2 is shaped to receive the cat litter. Blade 2 has front tapered edge 4, back edge 6, and two sides, sides 8A and 8B, disposed there between. Front tapered edge 4 is tapered or sloped so that it has a minimal height to more easily slide the cat litter onto the blade. Blade 2 has a plurality of openings to allow the litter mix to fall through, while continuing to retain the animal's excrement. The base can have one or more openings to allow for the litter mix to fall through. The openings can be large enough to allow the litter mix to fall through, but small enough to retain the excrement. In an embodiment, the openings have a width ranging between about ¼ inch to about ½ inch. The opening can be on the bottom surface of the blade, on the sides of the base, or both. The width of the blade can range between about 2 and about 10 inches, and in a preferred embodiment, the width of the base is about 5 inches. The blade communicates with back edge 6, which in an embodiment is also tapered. In viewing a cross section of scooper 30, blade 2 is the shape of a trough having two tapered edges and a thicker middle. The shape of the blade provides a middle area that can receive and retain the animal excrement during use. Although an embodiment of the present invention includes a trough, the blade can be of any shape so as to provide an area or pocket in which to receive the excrement (e.g., concave). The front edge can further be beveled, in one aspect.

Blade 2 extends between sides 8A and 8B. Sides 8A and 8B have a height that prevents the animal waste to easily fall off of the blade. The height of the sides ranges from about 1 inch to about 4 inches. The sides further include, in an embodiment, one or more openings to allow the cat litter to pass through, but not the animal waste.

The blades, the front edge, the back edge, and the sides are all connected and communicate with one another to form base 10. The base is preferably made from a plastic material, but can also be made from rubber, metal, wood, composite materials and the like. In an embodiment, it is preferred that the present invention is made from a light weight material. Injection molding techniques can be used to mold the scooper. Additionally, the base can have an anti-bacterial coating. Yet another embodiment includes a base having a high frictional upper surface to increase the excrement's ability to stay on the base during use. To create a friction-induced surface, the surface can be beveled, rough, irregular, periodically raised (e.g., bumps) and the like. The base has a width and/or a length ranging between about 3 inches and about 7 inches (e.g., about 5 inches).

Base 10 is attached to bottom portion 16 of angled elongated member 12. Elongated member 12 has at least two portions, top portion 14 and bottom portion 16. The bottom portion communicates with base and its axis is in line with that of the blade. Top portion 14 of elongated member 12 is used as a handle, and is angled in relation to bottom portion 16. The top portion and the bottom portion of the elongated member is angled in a range between about 100 degrees and between about 140 degrees, and in a preferred embodiment of about 120 degrees. The angle exists between the blade axis and the axis of the top portion of the elongated member.

Base 2 has base handle 9 which is mounted to bottom portion 16 of elongated member 12. Base handle 9 is mounted using two ring fasteners 22A and 22B. The base handle can be mounted using one or more devices known in the art and include, e.g., a hook & loop fastener, a clip, a band, a tie, and the like. The base can be mounted to the bottom portion of the elongated member with an adhesive. The base and the elongated member can be attached by mating complementary ends (e.g., a tongue and groove arrangement). In an embodiment, the base is removably attached to the elongated member so that the user can remove and reattach the base as desired. In another embodiment, the base is integrated with the elongated member into a single piece. See FIG. 6.

The elongated member can have cross-section that is rectangular, square, circular, trapezoidal, or irregular. In an embodiment, the elongated member is essentially rectangular, with rounded corners. The elongated member cross section can have any shape but is preferably shaped to be ergonomically received by a hand. Additionally, the elongated member can be solid, hollow, or a combination thereof. The elongated member has a diameter is between about ¼ inch to about 2 inches, and in a preferred embodiment between about ½ inch and about 1 inch.

The bottom portion of the elongated member is attached to the base. The elongated member is angled at a distance between about 6 inches to about 12 inches from the front edge, and in an aspect has a length of about 9 inches. The top portion of the elongated member has length of about 36 inches to about 60 inches, and in an embodiment has a length of about 48 inches.

Scooper 30 further includes hook 18. Hook 18 is positioned on the elongated member at or above the angle. The hook is attached to the bottom end of top portion of the elongated member, where the top and bottom portions meet. The hook, in an embodiment, is mounted to the elongated member at a height that is not greater than the height of the pail. The hook is a member that can be curved, or maintain a square angle, or an acute angle in relation to the top portion. The hook is mounted opposite the base, as shown in FIG. 1. The hook is used to receive the handle of a pail. The hook can be mounted by a variety of means including with, e.g., a screw, nail, adhesive, and the like. The elongated member and the hook can be mated so that the elongated member receives the hook (e.g., a tongue and groove arrangement). In an embodiment, the present invention can be made as a single piece, including the hook, as part of a mold.

Figure 2:
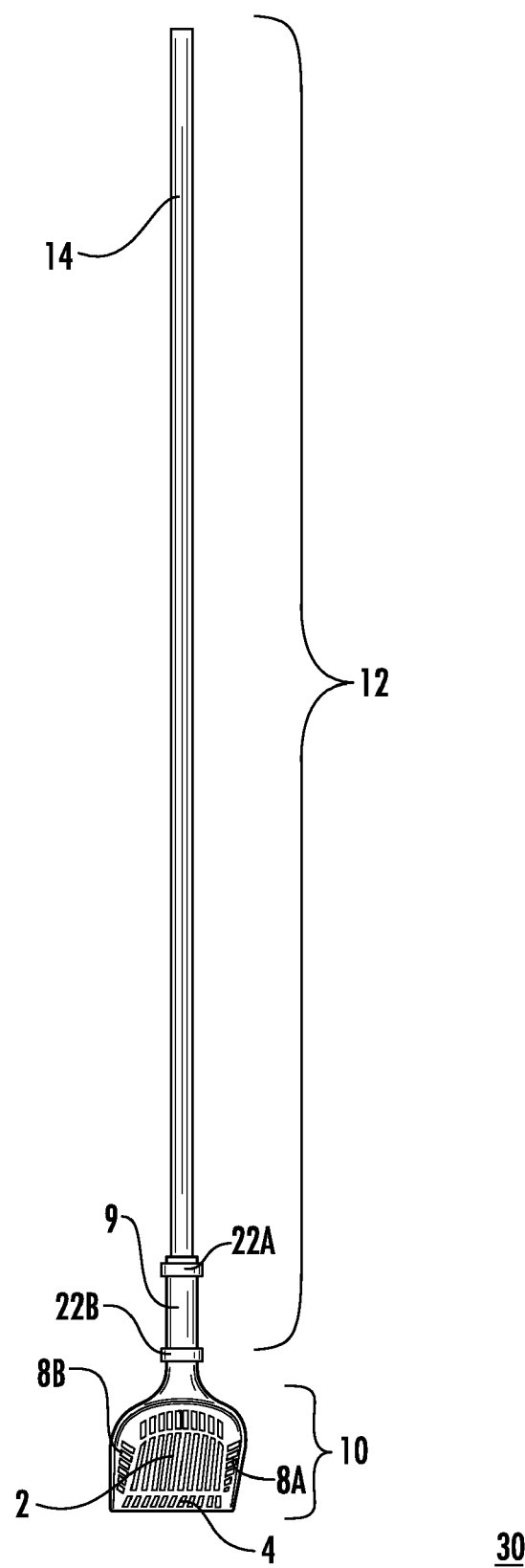
FIG. 2 is a schematic of a front view of the animal waste scooper of the present invention.

FIG. 2 shows the front view of scooper 30. Base 10, including blade 2, front edge 4, back edge 6 and sides 8A and 8B can be better seen. Base 10 includes a plurality of openings to allow animal litter to pass through, but not the animal waste.

Figure 3:
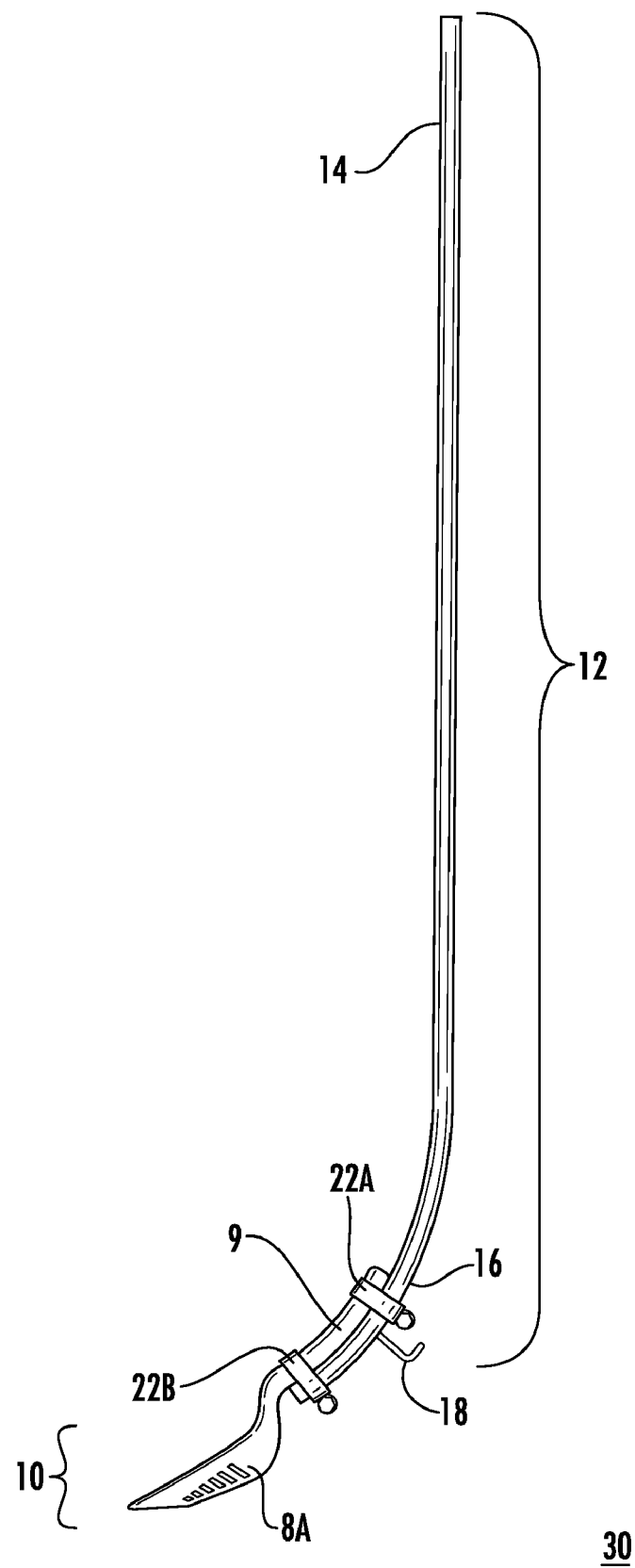
FIG. 3 is a schematic of a side view of the animal waste scooper of the present invention.

FIG. 3 shows the side view of scooper 30. This figure shows the angle of bottom portion 16 in relation to top portion 14, which is preferably about 120 degrees to one another, as described herein. The angle of the bottom and top portions ranges between about 100 and 140 degrees. An angle of about 120 degrees assists the user in scooping the animal waste so that it does not fall off of the scooper, but allows one to do so without having to bend. The angle at which the elongated member bends is an important aspect of the present invention.

Figure 4:
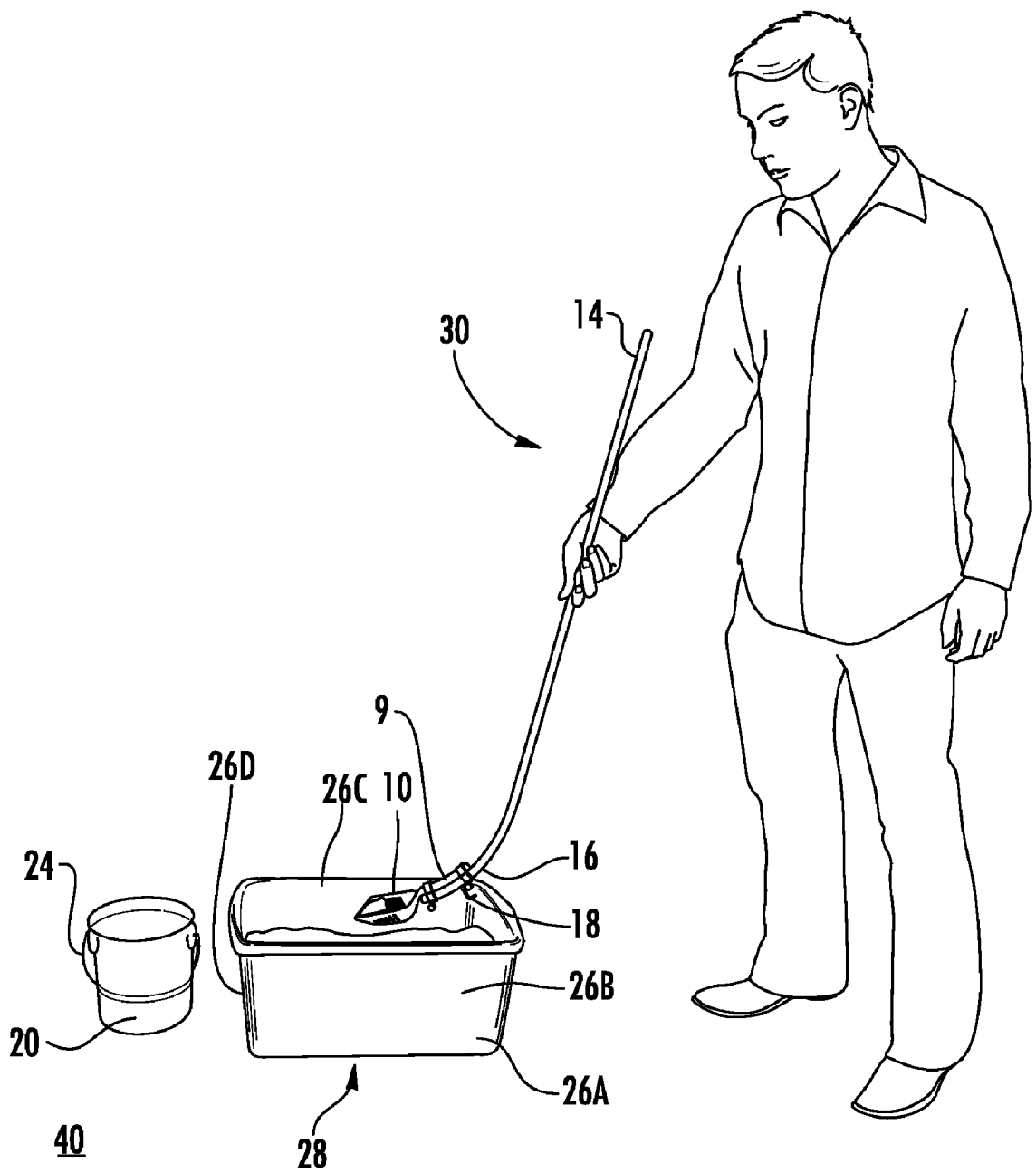
FIG. 4 is a schematic of perspective view of the animal waste system of the present invention as a person is removing the animal excrement without bending.
Figure 5:
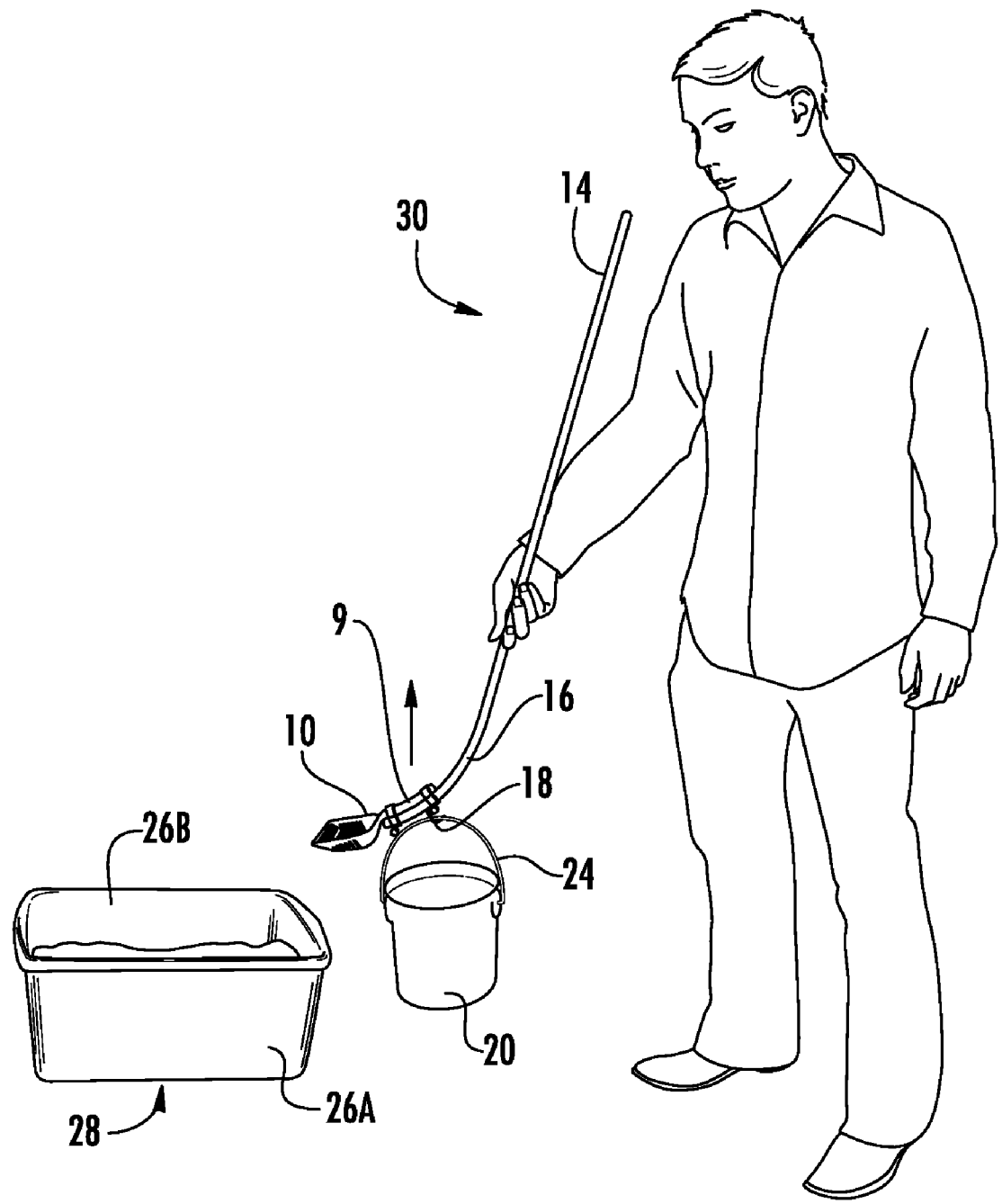
FIG. 5 is a schematic of a perspective view of the animal waste system of the present invention as a person is lifting a pail having the animal excrement.

FIGS. 4 and 5 show the system of the present invention in use. System 40 of the present invention includes scooper 30, pail 20 having a handle 24, and litter box 28. Handle 24 of pail 20 is used together with hook 18 of scooper 30. After scooping the animal waste, as shown in FIG. 4, out of litter box 28 with scooper 30, the user places the waste in pail 20. As shown in FIG. 5, the user then engages handle 24 of pail 20 with hook 18 to lift pail 20 to his hand for disposal. The animal waste is removed without the user having to bend over. This is especially helpful to those who have trouble bending or those who cannot kneel (e.g., elderly, persons having a hip or knee injury or after surgery).

Hence, the present invention relates to methods of using the system of the present invention. The methods include the steps of scooping the animal waste into the base of the scooper, and placing the animal waste into the pail. The user then engages the handle of the pail with the hook of the scooper to lift the pail, e.g., to the user's free hand, or a higher surface. Having access to the pail, the user can then dispose of the animal waste. This method is carried out without the user having to bend over or kneel.

Litter box 28 has a bottom surface (not shown) and sides 26A-D extending therefrom. Litter box sides 26A-D has a height that is taller than most litter boxes, which aid in the use of the present invention. A litter box with taller sides allows one to more easily manipulate and scoop the animal waste with the scooper, than a litter box with shorter sides. The height of the litter box also prevents the animal from pushing the litter out of the box when digging a hole in the litter. As such, the sides of the litter box a height ranging from about 8 inches to about 12 inches, and preferably about 10 inches. The litter box can be made from a light weight material such as plastic, rubber, composite, and the like.

Figure 6:
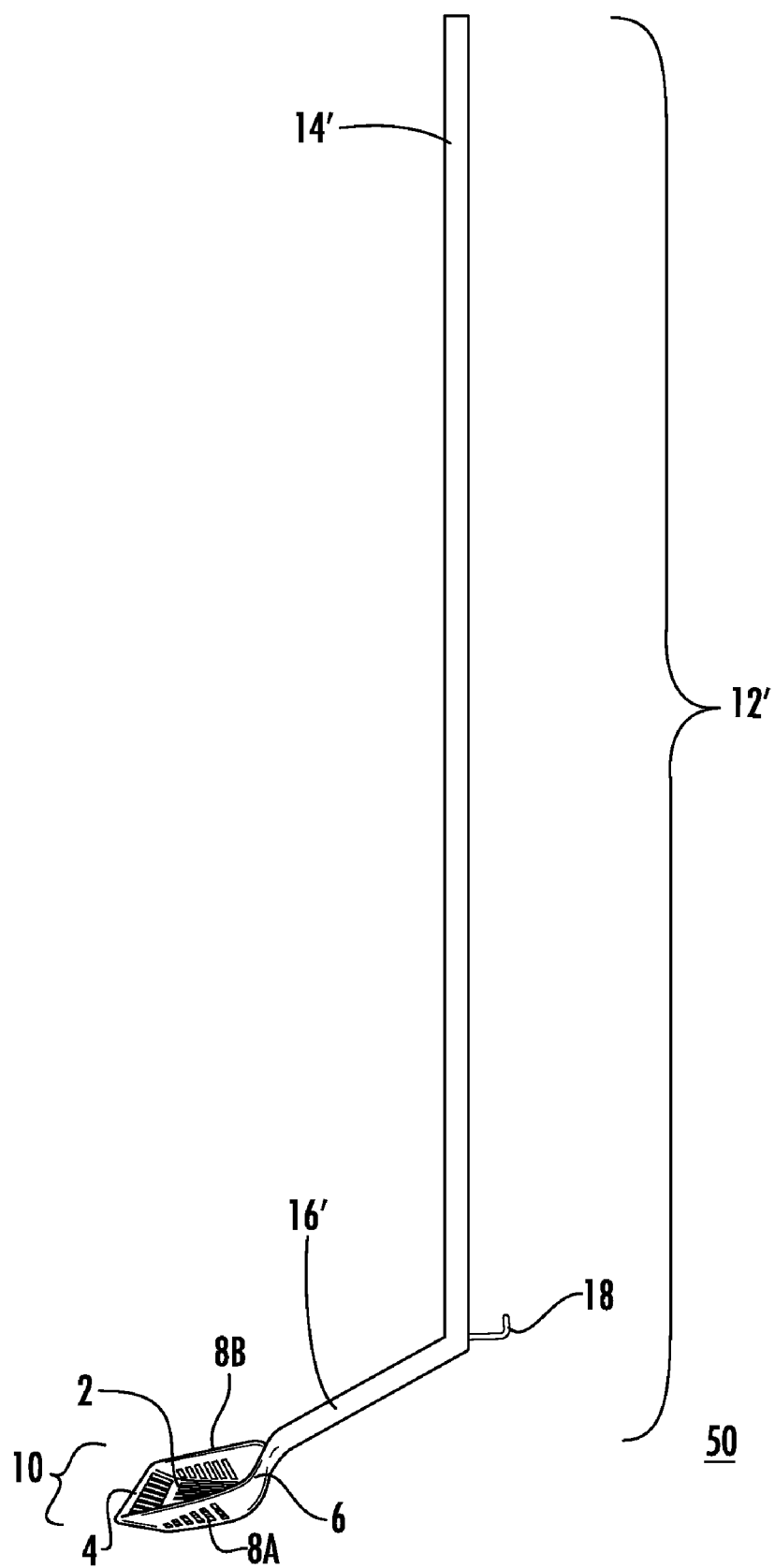
FIG. 6 is a schematic of a perspective view of another embodiment of the animal waste system.

FIG. 6 shows another embodiment of the present invention. As described herein, the present invention can have an elongated member that is integrated with the base. Scooper 50 includes elongated member 12' that has top portion 14' which is angled at 120 degrees in relation to bottom portion 16'. As such, fasteners are not needed. Base 10 is attached to the end of bottom portion 16'. Hook 18 is positioned just above the angle. Rather than being curved, the angle is a straight, obtuse angle.

The present invention also includes kits. For example, the present invention includes a kit to retro fit an existing scooper (e.g., cat litter scooper having a short handle) and includes the elongated member, having the angle described herein, the hook mounted thereto, and at least one fastener for fastening the handle of the scooper to the bottom portion of the elongated member. The fastener, in an embodiment, is a reclosable fastener so that the user can attach, disengage, and reattach the elongated member to the base. The kit can further include a pail with a handle, and optionally, a litter box, as described herein. In another embodiment, the scooper is made as a single unit wherein the elongated member and the base are integrated.

EXEMPLIFICATION

The system of the present invention was made. The elongated member was made of wood and bent to achieve an angle of about 120 degrees between the top and bottom portions of the elongated member. The bottom portion of the elongated member was attached to the base with 2 ring fasteners. The elongated member was angled at about 9 inches from the front edge of the base. The top portion of the elongated member was about 48 inches in height. The elongated member had essentially a rectangular cross-section, but with rounded corners. The width of the elongated member was about 1 inch.

The base has a blade, a front edge, a back edge, two sides. The base has a number of elongated openings to allow litter to pass through, but retaining the animal waste. The base was about 5 inches in width and about 5 inches in length.

Attached to the bottom portion of the elongated member is a metal hook. The metal hook was held in place with a screw.

The system of the present invention also included a deep litter box having a height of about 10 inches, a width of about 24 inches, and a depth of about 14 inches. The litter box was made of plastic.

The pail of the system of the present invention was a lightweight pail having a metal handle and a plastic grip.

The system of the present invention was used to remove cat waste from the litter box. In particular, the user scooped the cat waist from the litter box using the scooper, and placed the waste in the pail. The user was able to easily engage the handle of the pail with the hook of the scooper and lift the pail to his free hand. The user was able to do so without having to bend his knees or kneel down. The user then disposed of the animal waste.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. An animal waste scooper system of the present invention, the system comprises:
    a. a scooper comprising:
        i. a base that comprises a blade having a front edge, a back edge, a first side, a second side, a plurality of openings, wherein the blade has an axis;
        ii. a non-pivoting elongated member having a top portion and a bottom portion, wherein the base is attached to or at the bottom portion of the non-pivoting elongated member; and the bottom portion is angled such that the blade axis has an angle in a range of between about 100 degrees and 140 degrees in relation to the top portion; and
        iii. a hook mounted to the non-pivoting elongated member above the angle;
    b. a pail having a handle; and
    c. a litter box having a bottom surface and four sides extending from the bottom surface, the four sides having a height between about 8 inches and about 12 inches.

2. The animal waste scooper system of claim 1, wherein the bottom portion of the non-pivoting elongated member is angled at about 120 degrees in relation to the top portion of the non-pivoting elongated member.

3. The animal waste system of claim 1, wherein the length of the top portion has a length ranging from about 36 inches to about 60 inches.

4. The animal waste system of claim 3, wherein the length of the top portion has a length of about 48 inches.

5. The animal waste system of claim 3, wherein the length between the front edge and the angle ranges between about 6 and about 12 inches.

6. The animal waste system of claim 5, wherein the length between the front edge and the angle is about 9 inches.

7. The animal waste system of claim 1, wherein the base has a length or width ranging from about 2 inches to about 10 inches.

8. The animal waste system of claim 7, wherein the base has a length or width of about 5 inches.

9. An animal waste scooper that comprises:
    a. base that comprises a blade having a front edge, a back edge, a first side, a second side, a plurality of openings, wherein the blade has an axis;
    b. a non-pivoting elongated member having a top portion and a bottom portion, wherein the base is attached to or at the bottom portion of the non-pivoting elongated member; and the bottom portion is angled such that the blade axis has an angle in a range of between about 100 degrees and 140 degrees in relation to the top portion; and
    c. a hook mounted to the non-pivoting elongated member above the angle.

10. The animal waste scooper of claim 9, wherein the bottom portion is angled at about 120 degrees in relation to the top portion.

11. The animal waste scooper of claim 9, wherein the length of the top portion has a length ranging from about 36 inches to about 60 inches.

12. The animal waste scooper of claim 11, wherein the length of the top portion has a length of about 48 inches.

13. The animal waste scooper of claim 9, wherein the angle is positioned between about 6 inches and about 12 inches from the front edge of the base.

14. The animal waste scooper of claim 11, wherein the angle is positioned between about 9 inches from the front edge of the base.

15. The animal waste scooper of claim 9, wherein the base has a length or width ranging from about 2 inches to about 10 inches.

16. The animal waste scooper of claim 15, wherein the base has a length or width of about 5 inches.

17. A kit for retrofitting an animal waste scooper having base and a short handle, the kit comprises:

a. a non-pivoting elongated member having a top portion and a bottom portion, wherein the handle of the base can be removably attached to the bottom portion of the non-pivoting elongated member; and the bottom portion is angled in a range of between about 100 degrees and 140 degrees in relation to the top portion;

b. a hook mounted to the non-pivoting elongated member above the angle; and c. at least one fastener.

* * * * *